Patented Aug. 28, 1951

2,565,771

UNITED STATES PATENT OFFICE 2,565,771

STABILIZATION OF CYANOGEN CHLORIDE

Morris S. Kharasch, Chicago, Ill., assignor to the United States of America as represented by the Secretary of War No Drawing. Application April 2, 1946, Serial No. 659,136

8 Claims. (Cl. 23—14)

The invention described herein may be manufactured and used by or for the Government for governmental purposes without the payment to me of any royalty thereon.

This invention relates to the stabilization of commercial cyanogen chloride and particularly to stabilization under normal storage and shipping conditions.

The objects of this invention include a stabilized cyanogen chloride composition and a method for preparing the same.

Previous investigators have found that it was very difficult to stabilize cyanogen chloride unless the latter were absolutely pure. One proposal, that of Guy H. Buchanan, U. S. Patent 1,586,175, employs hydrogen cyanide as a stabilizer for liquid cyanogen chloride. There have also been other proposals for purifying cyanogen chloride in order that the product might be more stable.

While pyrophosphoric acid has been considered as a stabilizer for hydrogen peroxide, the problem of stabilizing cyanogen chloride, a non-oxygen-containing compound which tends to polymerize and to hydrolyze, is entirely non-analogous.

Cyanogen chloride is an effective fumigant and has other uses. It is unstable in steel containers, particularly in the presence of impurities, such as water. In the presence of alkalies, or acids, cyanogen chloride tends to decompose. Polymerization also occurs, yielding, among other products, cyanuric chloride and cyanuric acid. It is therefore very difficult to stabilize cyanogen chloride, particularly the commercial product which contains impurities and which has been, or is to be, in contact with ferrous metal containers.

I have discovered that it is possible to stabilize cyanogen chloride, which may contain water, hydrogen cyanide, hydrogen chloride and soluble iron salts as impurities, by adding a pyrophosphate, particularly an alkali metal pyrophosphate thereto. Limiting the water content, further aids in stabilization.

The cyanogen chloride produced in this country keeps well at elevated temperatures when stored in sealed glass tubes in the absence of steel. The effect of impurities in decreasing the stability of the cyanogen chloride in the presence of iron or steel is probably due to the formation of soluble iron compounds. The impurities present in the cyanogen chloride currently produced are: (1) hydrogen cyanide, (2) water, (3) hydrogen chloride, (4) soluble iron salts. Hydrogen cyanide in concentrations 0.3% to 2.35% has little or no effect on the stability of this product.

It is of the utmost importance to bear in mind that the lower the water content of the cyanogen chloride, the greater the stability of this material when aged in steel containers, and the greater the effectiveness of the substance used to stabilize it. The water content of the cyanogen chloride should not exceed 0.2%, for best results. Percentages of water up to 0.4% can be tolerated for military use.

The following table gives the effectiveness of various stabilizers at four different temperatures. The water content of the cyanogen chloride used in these tests varied between 0.15% and 0.35%.

TABLE I

*Stabilization of cyanogen chloride*

[Days for complete solidification in the presence of steel.]

| Temperature | Control | CaO | KF | $Na_4P_2O_7$ |
|---|---|---|---|---|
| 65° | 66, 70 | >228 (2% CaO) | 173 (2% KF) | >228, >228 (2% $Na_4P_2O_7$) |
| 75° | 35, 35 | 159, 181 (2% CaO) | 69, 88 (2% KF) | 247, 247 (2% $Na_4P_2O_7$) |
| 100° | 7, 7 | 20, 20 (5% CaO) | 13, 15 (5% KF) | >209, >209 (5% $Na_4P_2O_7$) |
| 125° | 1, 1.5 | 3, 5, 3.5 (5% CaO) | 2.5, 2.5 (5% KF) | 174, >209 (5% $Na_4P_2O_7$) |

Commercial sodium pyrophosphate is the best stabilizer yet found. Material conforming to the following specifications gives excellent and reproducible results.

(a) $P_2O_5$ content—not less than 52.5%.
(b) Fe content—less than 70 parts per million.
(c) Loss on ignition—less than 0.5% when ignited for two hours at 600°.
(d) Size of particles—all through 10 mesh sieve—approximately 90% through 100 mesh sieve.

Two lots of cyanogen chloride (0.056% HCl; 1.14% HCN; 0.03% $H_2O$) taken from the same sample were treated respectively with 0.2 and 0.5 weight percent of water and aged at 100°. The results obtained with this material are given in Table II.

TABLE II

*Surveillance of cyanogen chloride with water added*

[Temperature 100°.]

| Amount of Stabilizer and Steel | Days for Complete Solidification | Stabilizing Effect in Days | Remarks |
|---|---|---|---|
| No stabilizer or steel | 40, 40 | | |
| 0.3 g. steel (control) | 4, 7 | | |
| 5% $Na_4P_2O_7$+0.3 g. steel | >209, >209 | >202, >202 | |
| No stabilizer or steel | 11, 12 | | .2% $H_2O$ added. |
| 0.3 g. steel (control) | 7, 7 | | Do. |
| 5% $Na_4P_2O_7$+0.3 g. steel | 89, 89 | 82, 82 | Do. |
| No stabilizer or steel | 8, 12 | | .5% $H_2O$ added. |
| 0.3 g. steel (control) | 3, 6 | | Do. |
| 5% $Na_4P_2O_7$+0.3 g. steel | 15, 15 | 9, 9 | Do. |

The surveillance tests recorded in Table III were performed in the following manner. Samples (about 25 ml.) of cyanogen chloride which had never been stored in iron were aged in glass at 65° C. without agitation. To each 25 ml. lot was added a single strip (4″ x ⅜″) bomb steel. In some instances, 5% of weight of anhydrous tetrasodium pyrophosphate (stabilizer) was added to each lot of cyanogen chloride before the aging was commenced. After varying lengths of time, the tubes were opened and their contents filtered through a porous porcelain plate. The filtrate was divided into 3 ml. samples and each sample was aged in glass at 125° C. without agitation. In some instances, a strip of bomb steel (2″ x ⅝″) was added to these small samples, and in some instances, a similar strip and 5% by weight of sodium pyrophosphate.

TABLE III

*Stability of cyanogen chloride at 125° C. Before and after storage at 65° C. Samples not agitated*

| Storage Conditions of Cyanogen Chloride Used in 125° Surveillance | Solidification Times (Days) in Glass | | | Analysis | | | | |
|---|---|---|---|---|---|---|---|---|
| | No steel or stabilizer present | Steel but no stabilizer present | Steel and Stabilizer Present | Fe, Per Cent | SNVR[1] | $H_2O$ | HCl | HCN |
| Cyanogen Chloride Not Aged | 20.0, 23.0 | 1.5, 1.5 | 64, 82 | | | .08 | .0036 | 1.74 |
| 10 days in presence of steel at 65° | 7.0, 7.0 | 1.5, 1.5 | 77 | .008 | .05 | | .0184 | 1.69 |
| 20 days in presence of steel at 65° | 6.0, 7.0 | 1.5, 1.5 | 50, 64 | .012 | .073 | .087 | .025 | 1.63 |
| 30 days in presence of steel at 65° | 6.0, 6.0 | 1.5, 1.5 | 68, >70 | .019 | .095 | .061 | .032 | 1.68 |
| 40 days in presence of steel at 65° | 4.0, 4.0 | 1.5, 1.5 | 60, >60 | .022 | .13 | .08 | .042 | 1.69 |
| 10 days in presence of steel and stabilizer at 65° | 10.0, 16.0 | 1.5, 1.5 | 52, 52 | .008 | .055 | .053 | | |
| 20 days in presence of steel and stabilizer at 65° | >79, >79 | 2.0, 2.0 | 77, >79 | .007 | .036 | .026 | | |
| 30 days in presence of steel and stabilizer at 65° | 52, >68 | 2.0, 2.0 | >68, >68 | .0056 | .054 | .020 | | |
| 40 days in presence of steel and stabilizer at 65° | >59, >59 | 1.5, 1.5 | 43, >59 | .008 | | .012 | | |

[1] Soluble non-volatile residue.

Examination of this data discloses in every instance an enormous stabilizing effect on the part of the pyrophosphate.

Of all the substances tested, anhydrous sodium pyrophosphate ($Na_4P_2O_7$) in 2 to 5% by weight is the most effective stabilizer of the cyanogen chloride, currently produced in this country. Other pyrophosphates, particularly alkali metal pyrophosphates, may also be used however. Anhydrous tetrasodium pyrophosphate has been accepted by the CWS as the standard stabilizing agent for cyanogen chloride.

It will be understood that the foregoing descriptive matter and specific examples are to be interpreted as illustrative and are not to be construed in a limiting sense.

I claim:
1. A stabilized composition, comprising cyanogen chloride and a pyrophosphate as the stabilizing agent.
2. A stabilized composition, comprising cyanogen chloride and an alkali metal pyrophosphate as the stabilizing agent.
3. A stabilized composition, comprising cyanogen chloride and sodium pyrophosphate as the stabilizing agent.
4. A stabilized composition, comprising cyanogen chloride and 2 to 5% of anhydrous tetrasodium pyrophosphate as the stabilizing agent.
5. A stabilized composition, comprising cyanogen chloride, not more than .2% of water and a pyrophosphate as the stabilizing agent.
6. A stabilized composition, comprising cyanogen chloride, not more than .2% of water and an alkali metal pyrophosphate as the stabilizing agent.
7. A stabilized composition, comprising cyanogen chloride, not more than .2% of water and sodium pyrophosphate as the stabilizing agent.
8. A stabilized composition, comprising cyanogen chloride, not more than .2% of water and 2 to 5% of anhydrous tetrasodium pyrophosphate as the stabilizing agent.

MORRIS S. KHARASCH.

REFERENCES CITED

The following references are of record in the file of this patent:

UNITED STATES PATENTS

| Number | Name | Date |
|---|---|---|
| 2,194,370 | Walker | Mar. 19, 1940 |